Oct. 16, 1951     A. H. KING     2,571,256
REFRIGERANT COOLED INTERCOOLER
Filed Sept. 6, 1946     2 Sheets-Sheet 1
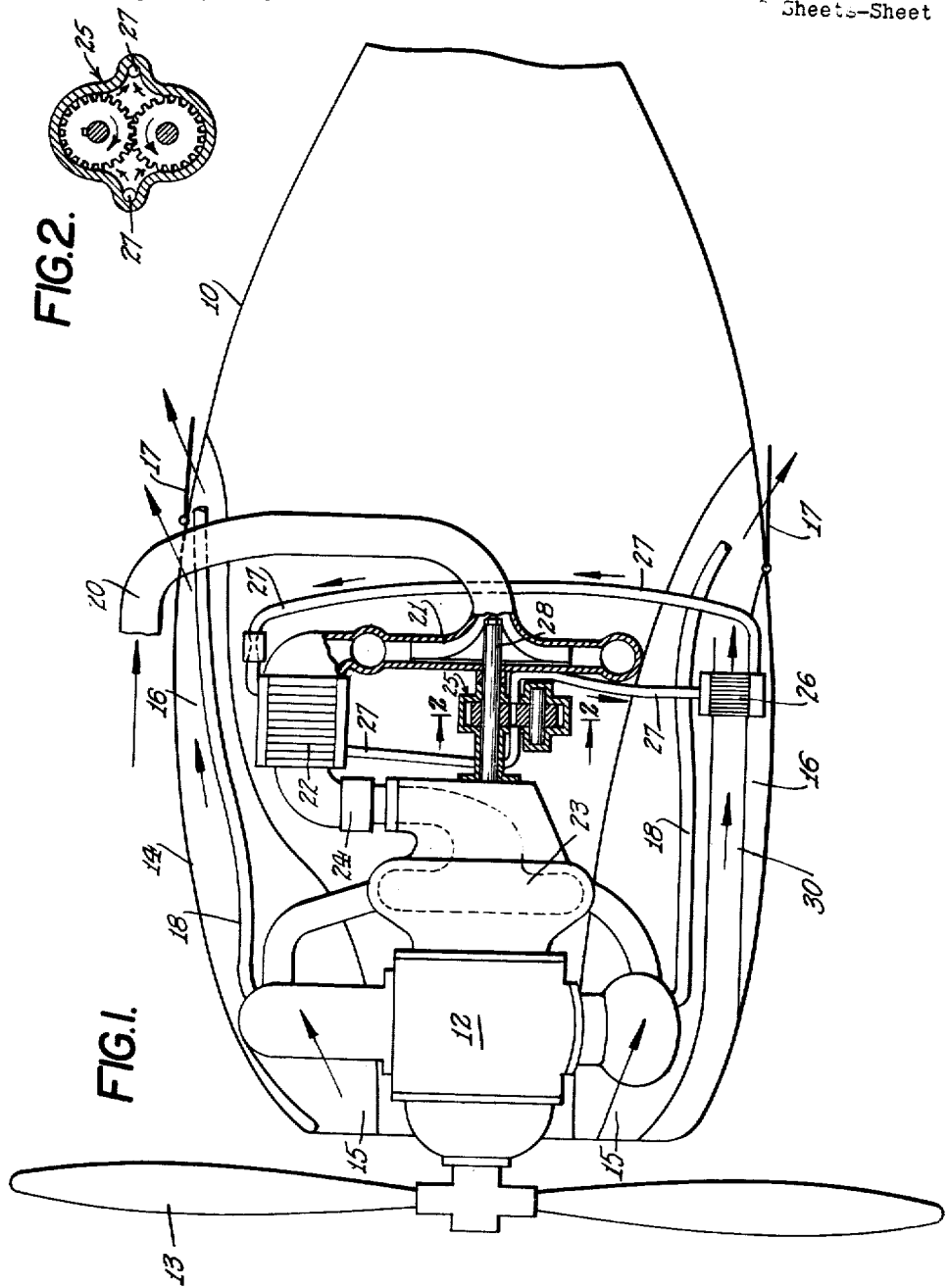
INVENTOR.
Alexander H. King
BY
Ernest D. Given
ATTORNEY

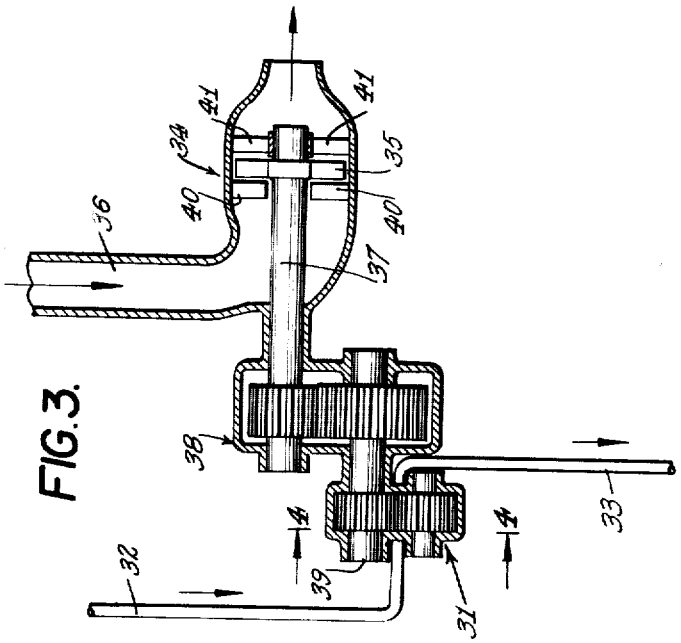
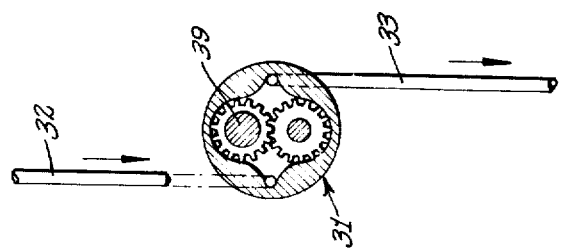

Patented Oct. 16, 1951

2,571,256

UNITED STATES PATENT OFFICE 2,571,256

REFRIGERANT COOLED INTERCOOLER

Alexander H. King, West Hartford, Conn., assignor to United Aircraft Corporation, East Hartford, Conn., a corporation of Delaware Application September 6, 1946, Serial No. 695,145

3 Claims. (Cl. 123—119)

This invention relates to cooling systems for aircraft power plants and has for its object to reduce the power consumption of such systems and thereby increase the operating efficiency of the power plant itself.

Another object of the invention is to provide a system of the above type which mechanically cools the air charge to the engine with less expenditure of power than in conventional systems employing air-cooled intercoolers for this purpose.

Another object is to provide a novel and improved combination of air-cooled internal combustion engine, a refrigerant cooled intercooler, and a refrigerating machine powered by the engine or the exhaust therefrom for supplying a refrigerant to the intercooler, to cool the combustible mixture before entering the intake manifold of the engine.

Various other objects and advantages will be apparent from the following specification as the nature of the invention is more fully disclosed.

It is conventional practice to mount an intercooler in the cooling air stream of an air-cooled aircraft engine to cool the combustible mixture after leaving the supercharger and before entering the intake manifold. However, a disadvantage of such systems is that air-cooled intercoolers large enough to cool the volume of air handled at high altitudes cause very high head resistance and consequent loss of airplane speed, which amounts to a net loss of effective horsepower.

I have now discovered that by removing the intercooler from the cooling air stream in a system of the above type, and utilizing a portion of the engine power mechanically to refrigerate the intercooler in a manner hereinafter described, the amount of horsepower used to operate the refrigerating machine is less than the loss heretofore incurred in air-cooled intercoolers by their high head resistance.

Although the novel features which are characteristic of this invention are set forth more in detail in the claims appended hereto, the nature and scope of the invention may be better understood by referring to the following description, taken in connection with the accompanying drawings forming a part thereof, in which a specific embodiment has been set forth for purposes of illustration.

In the drawings:

Figure 1 is a diagrammatic illustration of an aircraft power plant having a cooling system embodying the present invention;

Fig. 2 is a fragmentary detailed view substantially in vertical section on the line 2—2 of Fig. 1 and on an enlarged scale showing the refrigerant pump;

Fig. 3 is a fragmentary detailed view substantially in transverse section illustrating a modified form of pump drive in which the power is derived from the exhaust gases from the engine; and Fig. 4 is a fragmentary detailed view substantially in vertical section on the line 4—4 of Fig. 3.

In the following description certain specific terms are used for convenience in referring to the various details of the invention. These terms are to be interpreted in the manner conventional in the art.

In the drawings, an engine nacelle 10, forming part of the fuselage of an airplane, contains a power plant including an engine 12 driving a propeller 13, and is surrounded by a cowl 14.

An air inlet 15, leading to air passages 16 containing outlet flaps 17, provide for the passage of cooling air over the heat exchanging surfaces of engine 12.

Exhaust pipes 18 from the engine cylinders extend through the passages 16 and discharge adjacent to the air outlets, thus assisting in propelling the engine cooling air through said passages.

The intake air to the engine is admitted through a pipe 20 which is connected to a supercharger 21. This supercharger is connected to an intercooler 22 which, in turn, is connected to a second stage supercharger 23 leading to the intake manifold of the engine. Fuel is admitted to the airstream through a pipe coupling 24 in any suitable manner.

The intercooler 22, which is outside the cooling air passages 16 and therefore cannot cause head resistance in flight, is cooled by a mechanical refrigerating system including a mechanical pump 25, a condenser 26, and suitable conduits 27 for circulating the refrigerant through the system as indicated by the directional arrows in the drawings.

The pump 25 may be of any suitable type actuated by the engine 12 or the exhaust gases therefrom, and is here illustrated as a gear pump having a driving shaft 28 operated by the engine crankshaft. The condenser 26 is mounted in an air conduit 30 extending through one of the air passages 16 and discharging into said passage adjacent to one of the outlet flaps 17.

The heat dissipated by the condenser 26 is thus passed to the air stream, but, since the condenser will operate at a temperature higher than that of the compressed mixture, the heat transfer surface area of this condenser need not be as large as the heat exchange areas of conventional air-cooled intercoolers and there will therefore be a resultant saving in drag horsepower.

By thus isolating the intercooler 22 from the cooling air stream flowing through passages 15, and utilizing a portion of the engine power to operate the refrigerant pump 25 mechanically to refrigerate the intercooler, the amount of power consumed by the cooling system is less than the loss of effective horsepower heretofore incurred by the air-cooled intercoolers of the prior art.

Referring now to the modified form of the invention shown in Figs. 3 and 4, there is illustrated a gear pump 31, substantially similar to the pump 25 previously described for the Figs. 1 and 2 form of the invention. This pump is arranged to be connected by a pipe 32 with the intercooler 22, shown in Fig. 1, and by a pipe 33 with a condensing means, as shown at 26, Fig. 1. The pump is arranged to be driven in accordance with this form of the invention, from a gas turbine device generally indicated at 34 and including a plurality of vanes 35 in an exhaust passage 36 for exhaust gases from the engine. The vanes 35 are preferably mounted upon a drive shaft 37 which is connected through a reducing gearing generally indicated at 38 to drive the shaft 39 of the pump 31. The vanes 35 are preferably located as shown between two sets of fixed vanes, as shown at 40 and 41. The operation of the device will be obvious from the above description.

Although a specific embodiment has been shown and described herein for purposes of illustration, it will be evident to those skilled in the art that the invention is capable of various modifications and adaptations within the scope of the appended claims.

What is claimed is:

1. An internal combustion engine for use in an aircraft, an air intake line connected to said engine, two superchargers in series in said air intake line, an intercooler between said superchargers, and means for mechanically refrigerating said intercooler, the last named means including means providing a closed cyclic path including said intercooler for a compressible refrigerant, a refrigerant compressor interposed in said path, and a cooling means for the compressed refrigerant disposed in said path between said compressor and said intercooler, the refrigerant expanding in said intercooler to absorb heat from said aircraft further having a motor actuated by exhaust gas from said engine, by power from said engine.

2. An internal combustion engine in accordance with claim 1, wherein said engine is of the air-cooled type and is located in an air passage of an aircraft, so that said engine will be cooled by a cooling air stream created by the flight of the aircraft, which air stream passes over heat exchanging surfaces of said engine, and a separate air conduit for some of the air of said cooling air stream by-passing said heat exchanging surfaces, and wherein said cooling means for the compressed refrigerant is located in said separate air conduit.

3. An internal combustion engine in accordance with claim 1, wherein said refrigerant compressor is driven by a motor, which is in turn actuated by exhaust gas from said engine.

ALEXANDER H. KING.

REFERENCES CITED

The following references are of record in the file of this patent:

UNITED STATES PATENTS

| Number | Name | Date |
|---|---|---|
| 1,913,273 | Hammers et al. | June 6, 1933 |
| 1,949,812 | Read | Mar. 6, 1934 |
| 2,264,848 | Kahl | Dec. 2, 1941 |
| 2,318,834 | Birkigt | May 11, 1943 |
| 2,346,463 | Szekely | Apr. 11, 1944 |
| 2,353,966 | Newcombe | July 18, 1944 |
| 2,366,365 | Sorenson | Jan. 2, 1945 |
| 2,385,033 | Schwarz | Sept. 18, 1945 |
| 2,398,655 | Mayer | Apr. 16, 1946 |

Certificate of Correction

Patent No. 2,571,256                                    October 16, 1951

ALEXANDER H. KING

It is hereby certified that error appears in the printed specification of the above numbered patent requiring correction as follows:

Column 4, lines 11 and 12, strike out the words and comma "said aircraft further having a motor actuated by exhaust gas from said engine," and insert instead *air passing to the engine through said intake line, and means for driving said refrigerant compressor*;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*